(12) United States Patent
Munson et al.

(10) Patent No.: US 9,222,057 B1
(45) Date of Patent: Dec. 29, 2015

(54) PRECISION CUTTING TOOL FOR CUTTING OR TRIMMING PILLAR CANDLES

(71) Applicants: Richard Wheeler Munson, South Bristol, ME (US); Brian L. Giles, Edgecomb, ME (US)

(72) Inventors: Richard Wheeler Munson, South Bristol, ME (US); Brian L. Giles, Edgecomb, ME (US)

( * ) Notice: Subject to any disclaimer, the term of this patent is extended or adjusted under 35 U.S.C. 154(b) by 0 days.

(21) Appl. No.: 14/854,638

(22) Filed: Sep. 15, 2015

Related U.S. Application Data

(63) Continuation of application No. 14/569,992, filed on Dec. 15, 2014.

(60) Provisional application No. 61/997,074, filed on May 21, 2014.

(51) Int. Cl.
| | |
|---|---|
| *B23D 21/04* | (2006.01) |
| *C11C 5/02* | (2006.01) |
| *B26D 3/16* | (2006.01) |
| *B23D 21/08* | (2006.01) |

(52) U.S. Cl.
CPC ............ *C11C 5/028* (2013.01); *B26D 3/169* (2013.01); *B23D 21/04* (2013.01); *B23D 21/08* (2013.01)

(58) Field of Classification Search
CPC ........ C11C 5/028; B23D 21/04; B23D 21/08; B26D 3/169
USPC ....................................... 30/93–97
See application file for complete search history.

(56) References Cited

U.S. PATENT DOCUMENTS

| | | | | |
|---|---|---|---|---|
| 2,317,944 | A * | 4/1943 | Schaefer ............. | H02G 1/1224 |
| | | | | 30/90.3 |
| 2006/0006582 | A1 * | 1/2006 | Strelnieks ............ | B29C 67/241 |
| | | | | 264/330 |

OTHER PUBLICATIONS

NPL_1 (Aliweb Romania, How it's made carved candles Confectionare lumanari sculptate tip candela, Feb. 5, 2015, youtube, https://www.youtube.com/watch?v=HJD9M3JQwYM).*

* cited by examiner

*Primary Examiner* — Ned Landrum
*Assistant Examiner* — Liang Dong
(74) *Attorney, Agent, or Firm* — Caseiro Burke LLC; Chris A. Caseiro

(57) ABSTRACT

A precision cutting tool for removing the excess wax wall of a pillar styled candle includes a ring configured to encircle the candle and a handle extending from the ring. The handle includes an extendible and retractable cutting element. The cutting element may be extended into the circle defined by the interior circumference of the ring in a gradual manner. The tool includes a recess for the cutting element to be retained when the tool is not in use. The interior of the handle includes a cutting element mover configured to cause linear movement of the cutting element into and partially out of the recess. When the mover is actuated in a direction that results in movement of the cutting element out of the recess, the cutting element extends partially into the candle located in the interior circle established by the ring. The candle or the tool may then be rotated to cause cutting into the candle wall until the excess wax wall can be removed.

5 Claims, 4 Drawing Sheets

PRECISION CUTTING TOOL FOR CUTTING OR TRIMMING PILLAR CANDLES

CROSS REFERENCE TO RELATED APPLICATION

The present application is a divisional application, and claims the priority benefit, of U.S. nonprovisional patent application Ser. No. 14/569,992 filed Dec. 15, 2014, entitled "Precision Cutting Tool for Pillar Candle Cutting" of the same named inventors. The parent application is a nonprovisional and claims the priority benefit of U.S. provisional patent application Ser. No. 61/997,074, filed May 21, 2014, entitled "Precision Cutting Tool for Cutting/Trimming Pillar Style Candles" of the same named inventors. The entire content of the two applications is incorporated herein by reference.

BACKGROUND OF THE INVENTION

1. Field of the Invention

The present invention relates to cutting tools. More specifically, the present invention relates to tools that can be used to cut candle wax. Still more specifically, the present invention relates to tools for cutting the excess waste of excess walls of pillar styled candles that have been used.

2. Description of the Prior Art

The present invention resolves a problem that has plagued man for thousands of years. What to do with candles that have been used and for which perimeter walls remain while the candle wick is recessed within those walls, thereby diminishing effectiveness? The invented product is a precision cutting tool for use in safely trimming/cutting away the excess waste paraffin wax walls that surround the burned down core of pillar styled candles.

Pillar styled candles (primarily $2\frac{7}{16}^{th}$-in to $2\frac{7}{8}^{th}$-in diameter at the base) differ from dinner styled candles (primarily 1-in in diameter and 12-18-in in height) in that their larger diameter provides stability and therefore lessens the fire hazard characteristic of the less stable 1-in dinner styled candle. They are more conveniently able to stand alone without a broader supporting base. In addition to greater stability, the larger-diameter pillar styled candles have more wax material between their perimeters and their essentially centered wick(s). That extra wax material that is a characteristic of pillar styled candles provides more fuel to enable longer duration of burning time for the generating of ambient light, heat, and aroma (when fragrance is added).

The thick paraffin walls of the pillar styled candles are the source of the historic problem associated with their use. While the thicker walls (relative to the walls of the dinner styled candies) provide additional fuel to produce a candle that lasts longer than the dinner styled candies, there is a point of diminishing return when the added thickness becomes a liability rather than an advantage. Specifically, unlike the dinner styled candles, the pillar styled candle has, however, a historical problem that has frustrated candle enthusiasts ever since the pillar style was originated. The problem develops when the as the wick is burning and is consuming the fuel embodied in the paraffin/wax. As the wick (which may be one or more wicks in these types of candles, burns, the wax underneath it melts and the wick retreats deeper and deeper down into the burned out "core" or "crater" candle, resulting in a 360-degree perimeter "wall of paraffin/wax waste" around the burning wick. That perimeter wall of waste does not contribute to the fuel burned. Instead, it does block or otherwise shade the light of the burning wick, more so as the wick retreats deeper into the center of the candle.

A personal safety problem is also created when a person attempts to relight the wick when it is deep in the crater of the burned down candle. When extending a match down into the center of the annulus formed by the used candle with its perimeter wall of waste, the heat and flame from the match rapidly travels up the match and may burn the user's finger tips.

These two primary limitations associated with the use of pillar styled candles limit their value. First, a candle lighted at an important point in time, such as during a power outage, may not be as effective at lighting a darkened area as desired. Second, a person may be reluctant to use such a candle to avoid being burned by a match extending into the candle center. Therefore, a person may purchase a pillar styled candle having a certain amount of fuel in the form of wax but can only recover a portion of the investment in that candle when the wick extends far enough into the candle center to render it useless to that user. In other words, the return on investment in the candle is not as good as it could be due to the formation of the wall of waste.

What is needed is a device to improve the return on investment in a pillar styled candle. Further, what is needed is such a device that is convenient to use and effective for its intended purpose. It is desirable to have a device that extends the effective life of a pillar styled candle.

SUMMARY OF THE INVENTION

It is an object of the present invention to provide a device to improve the return on investment in a pillar styled candle. It is also an object of the present invention to provide such a device that is convenient to use and effective for its intended purpose. The present invention is configured as a device that can be used to extend the effective life of a pillar styled candle.

These and other objects are achieved with the present invention, which is a precision cutting tool for pillar styled candles. The precision cutting tool extends the life of a pillar styled candle, which has uses including, but not limited to, aesthetic, ceremonial, economic and ecological purposes, by enabling the removal of the waste wall of such candles. It is recognized that people in many households reach for pillar styled candles when their electricity supply fails. The invention assists these people by enabling them to cut away the wall of wax waste, thereby ensuring a brighter light when the candle is in use. In addition, the life of that brighter light is extended while at the same time the concern of finger burn when lighting occurs is eliminated.

Prior attempts to solve the wall waste problem appear to be unsuited for commercialization. That is, they are either too costly or too complex for consumers to use on such a relatively simple household item such as a candle. As a result, people widely continue to suffer through the limits of pillar styled candles previously described. To reach the enormous worldwide market and solve the problems noted, it was necessary to develop the precision cutting tool of the present invention. The venerable cooper pipe cutter was the source of inspiration.

To reach the price point needed for mass production potential, it was necessary to keep the present invention simple. It also had to be as uncomplicated to operate as possible for a wide range of users. Durability and safety were paramount while staying focused on a consumer price range needed to attract the average home owner, candle enthusiast and commercial end user via traditional distributor and consumer retailer consumer outlets ranging from gift shops to maintenance wholesalers and mass merchandiser entities.

Pillar candles that can stand upright without the need of a supporting base/stand receptacle must be trimmed to cut away and remove the excess paraffin/wax walls in order to maintain the intended usefulness and maximize the owner's investment. The tool, which may also be referred to herein from time to time as the device, comprises a ring configured to encircle a pillar styled candle, and a handle extending from the ring. The handle includes an extendible and retractable cutting element. The cutting element may be extended into the circle defined by the interior circumference of the ring in a gradual manner. The area of the tool where the handle and the ring interface includes a recess for the cutting element to be retained when the tool is not in use. The interior of the handle includes a cutting element mover configured to cause linear movement of the cutting element into and partially out of the recess. When the mover is actuated in a direction that results in movement of the cutting element out of the recess, the cutting element extends partially into the interior circle established by the ring.

When the precision cutting tool of the present invention is positioned so that a pillar styled candle is located within the interior of the ring, it can be used to cut away excess waste wall of the candle. Specifically, the ring of the tool is sized so that its inner diameter is greater than the outer diameter of the candle. The user may select where along the height of the candle the tool is aligned. In use, it may be positioned at or slightly above the height of the candle's wick. When the cutting element mover is actuated to extend the cutting element out of the tool recess, it engages the outer diameter of the candle. The mover may be further actuated so that the cutting element digs into the candle wall a selectable distance. The tool handle is then moved while the candle is maintained in position. During the course of that movement, the cutting element cuts into the candle wall around the entire perimeter of the candle, thereby cutting into the candle for the selectable distance. The mover may be further actuated to extend the cutting element further into the candle wall and the tool rotated again. This action cuts further into the candle wall. These steps of mover actuation for the purpose of cutting element extension and rotation of the wall may be repeated as often as is necessary until such time as the cutting element extends completely through the waste wall of the candle and cut completely through the wall around the entire candle perimeter. The excess wall of wax may then be removed, resulting in a candle of shorter height and with a readily accessible wick. The cutting element mover may be actuated in the reverse direction to cause linear retraction of the cutting element into the recess.

The precision cutting tool used in the manner described provides an effective means for removing excess wax wall of pillar styled candles. The location of the cutting element with respect to the handle employed to cause rotational movement of the tool maximizes safe usage. The cutting element may be a disk with cutting teeth or a sharp razor edge but is not limited to being round. If the disk includes cutting teeth, they may be fine or course dependent on the desired quality of the candle wall cut. These and other advantages of the present invention will become more readily apparent upon review of the following detailed description, the accompanying drawings and the appended claims.

DETAILED DESCRIPTION OF THE INVENTION

Figure 1:
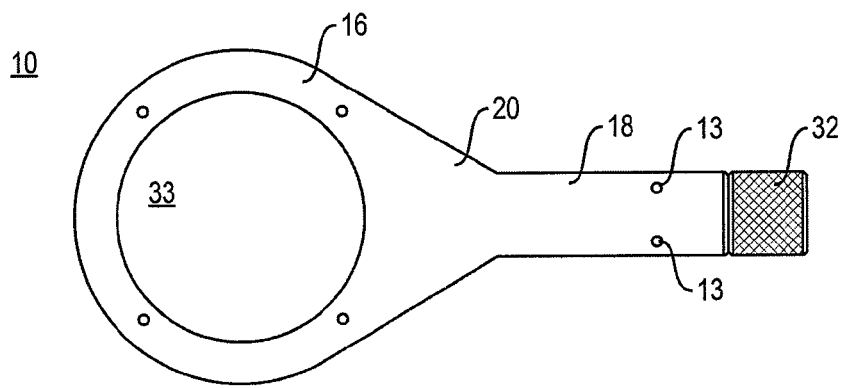
FIG. 1 is a plan view of the precision cutting tool of the present invention.
Figure 2:
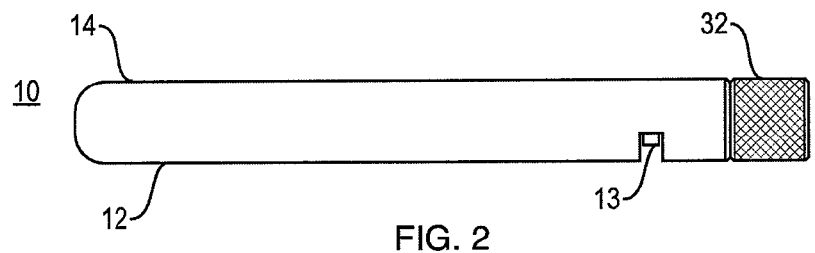
FIG. 2 is a side view of the precision cutting tool of the present invention.
Figure 3:
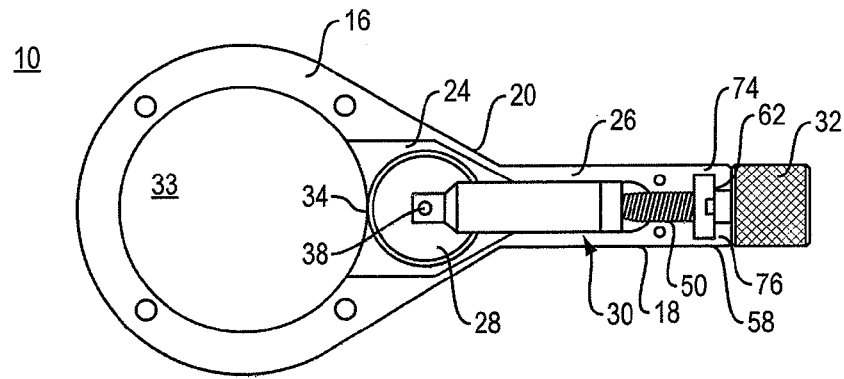
FIG. 3 is a cross sectional plan view of the precision cutting tool showing the cutting element and actuation system.
Figure 4:
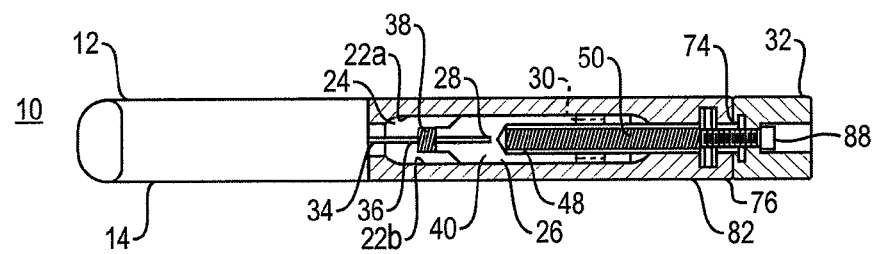
FIG. 4 is a cross sectional side view of the precision cutting tool showing the cutting element and actuation system.

A precision cutting tool 10 of the present invention is shown in FIGS. 1-5. The tool 10 includes an upper housing 12 and a lower housing 14 removably connected together with one or more attachment components such as screws 13 that may be recessed into the respective housings 12 and 14. The tool 10 includes a ring section 16 and a handle section 18. The tool may be fabricated as two pieces, as shown, or it may be fabricated as a unitary structure. The upper housing 12 and the lower housing 14 may be fabricated of a material such as a nonmetallic material. It may also be fabricated of a metallic material although it is desirable to minimize its weight, reduce corrosion possibilities and minimize cost. The upper housing 12 and the lower housing 14 may be fabricated of Delrin™, for example. The upper housing 12 and the lower housing 14 when combined together establish the ring section 16 that transitions through transition section 20 to the handle section 18.

Each of the upper housing 12 and the lower housing 14 includes a cavity 22A and 22B, respectively, in the handle section 18 and the transition section 20. The cavities 22A and 22B are arranged to form a cutting element recess 24 and an actuator recess 26 when the upper housing 12 and the lower housing 14 are joined together. The cutting element recess 24 is configured to retain a cutting element 28 therein and the actuator recess 26 is configured to retain an actuator 30 therein. The cutting element 28 and the actuator 30 may be fabricated separately from the fabrication of the upper housing 12 and the lower housing 14.

The tool 10 further includes a knob 32 that is coupled to the actuator 30 and is thereby connected to the upper housing 12 and the lower housing 14 of the tool 10. The knob may be fabricated of a metallic material or a nonmetallic material. It may be knurled, as shown, to provide added gripping surface when used to extend or retract the cutting element 28 from and into the cutting element recess 24.

With reference to FIGS. 3, 4 and 6-10, the cutting element 28 and the actuator 30 provide the mechanism for cutting the waste wall of a candle when the candle is positioned in interior space 33 of the ring section 16. Specifically, the cutting element 28 is a disk having a sharpened edge 34 and a portal 36 for retaining a retaining pin 38 therein. The cutting element 28 may also have a serrated edge. The actuator 30 includes a blade holder 40 that includes portal 42 of blade holder head 44, which is also arranged for retaining the retaining pin 38 therein. When the retaining pin 38 is positioned through the portal 36 of the cutting element 28 and through the portal 42 of the blade holder 40, the cutting element 28 is removably connected to the actuator 30. The retaining pin 38 may be removed from the portals 36 and 42 when the cutting element 28 is to be removed and sharpened or replaced.

Figure 5:
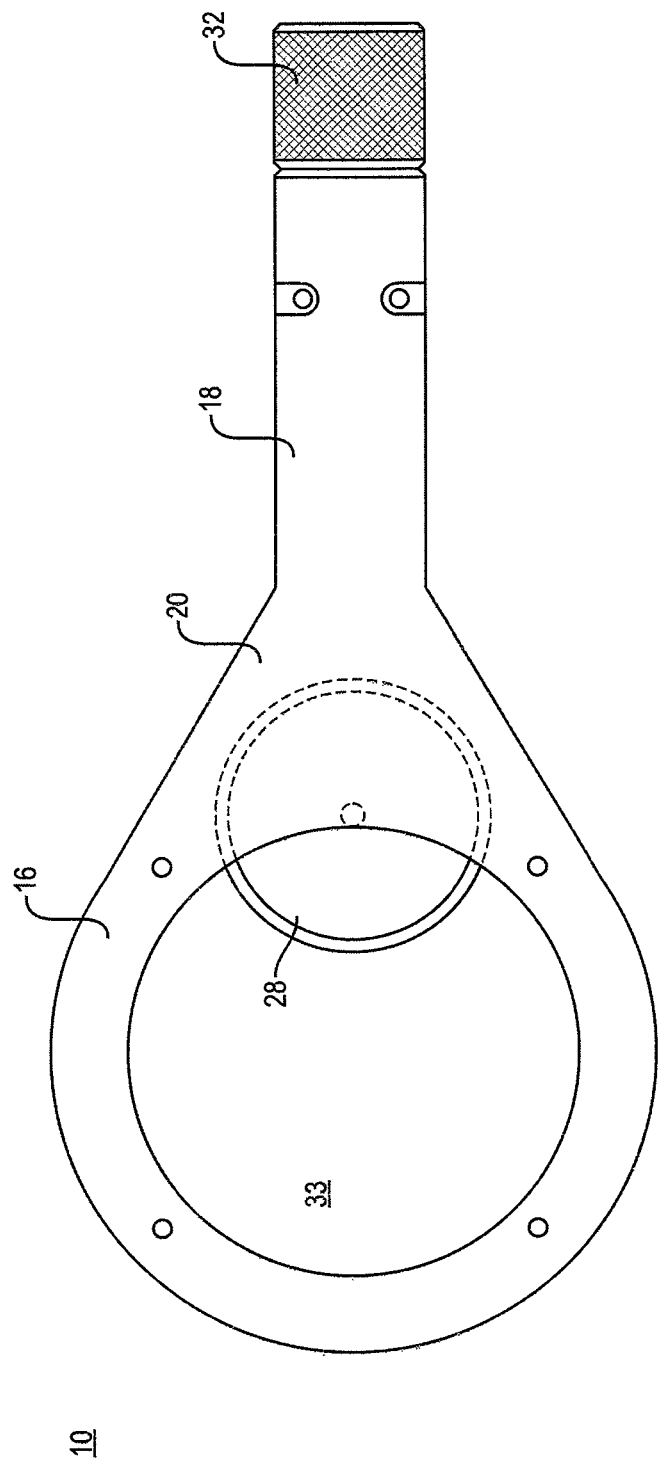
FIG. 5 is a plan view of the precision cutting tool showing the cutting element extended into the interior space of the ring.
Figure 6:
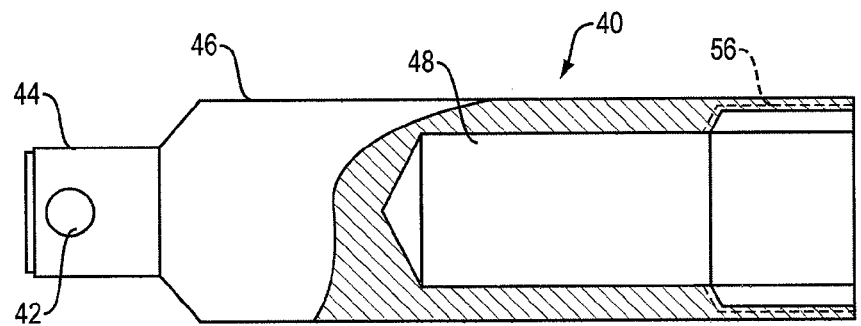
FIG. 6 is a partial cross sectional side view of the cutting element holder of the precision cutting tool.
Figure 7:
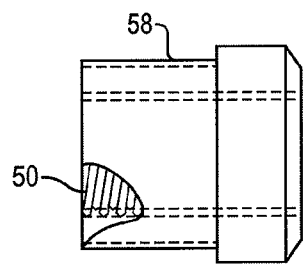
FIG. 7 is a partial cross sectional side view of the two-way nut of the precision cutting tool.

The blade holder 40 of the actuator 30 further includes a holder body 46 with an advancing cavity 48 for retaining therein a drive shaft 50. The drive shaft 50 includes a threaded main body 52 and a retaining stud 54 extending from the main body 52. The advancing cavity 48 of the holder body 46 further includes a threaded portal 56 for retaining thereto a nut 58 that is engaged with the drive shaft 50 so that when the drive shaft 50 is rotated clockwise or counter clockwise, the holder body 46 also moves forward or backward at the same time. That action cause the cutting element 28 to move into and out of the cutting element recess 24. FIG. 5 shows the cutting element 28 extended from the cutting element recess 24.

Figure 8A:
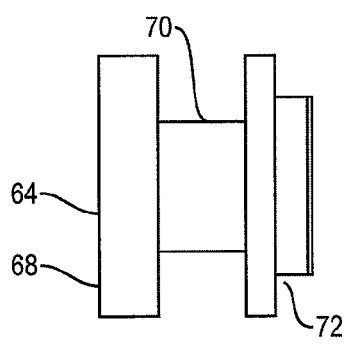
FIG. 8A is a side view of the thrust spool of the precision cutting tool and FIG. 8B is a cross sectional side view of the thrust spool.
Figure 8B:
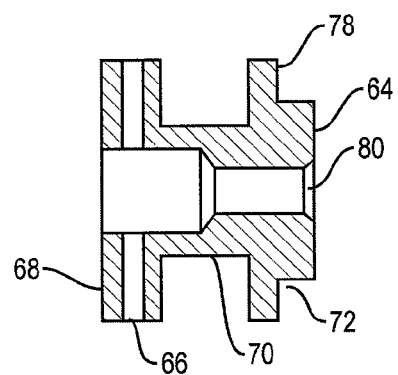

The retaining stud 54 of the drive shaft 50 includes portal 60 for removably placing therein pin 62 used to join the drive shaft 50 to a thrust spool 64 shown in FIGS. 8A and 8B. The thrust spool 64 includes a drive shaft portal 66 for passing the pin 62 through the thrust spool 64 and the stud 54 of the drive shaft 50 to join those two components together. The thrust spool 64 also includes a blade holder flange 68, a recessed body 70 and a knob flange 72. The blade holder flange 68 includes the drive shaft portal 66. The recessed body 70 of the thrust spool 64 is arranged to be held in position between the upper member 12 and the lower member 14 of the tool 10 at retaining shoulders 74 and 76 when the upper member 12 and the lower member 14 are joined together.

Figure 9:
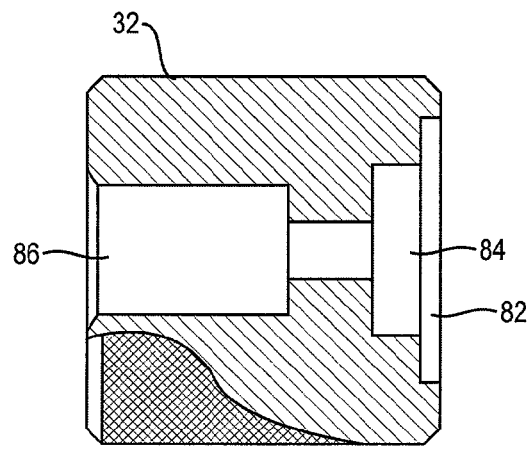
FIG. 9 is a cross sectional side view of the knob of the handle of the precision cutting tool.
Figure 10:
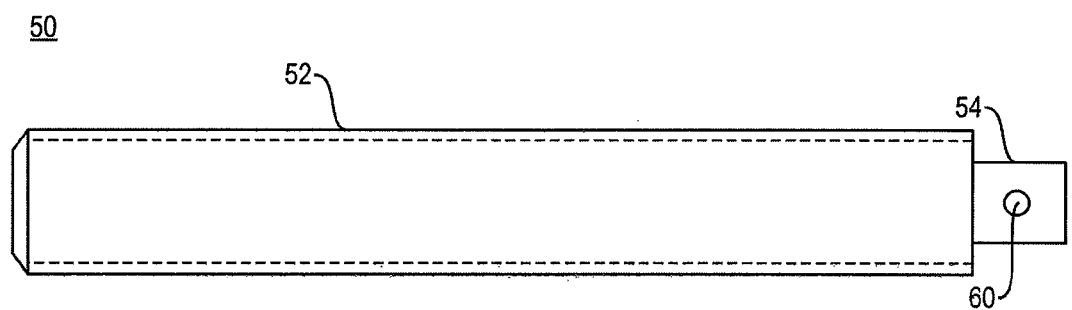
FIG. 10 is a side view of the drive shaft of the precision cutting tool.

The knob flange 72 includes shoulder 78 and head 80. The shoulder 78 and the head 80 of the thrust spool 64 are arranged to fit in first cavity 82 and second cavity 84, respectively, of knob 32 as shown in FIG. 9. The first cavity 82 and the second cavity 84 are sized so that the knob 32 may be rotated without engaging and causing movement of the thrust spool 64. That is, the first cavity 82 and the second cavity 84 establish spaces for the knob flange 72 to be recessed. The knob 32 further includes advancing screw shaft 86 for retaining therein advancing screw 88. The advancing screw 88 is coupled to the thrust spool 64 so that clockwise or counter-clockwise rotation of the knob 32 causes corresponding rotation of the thrust spool 64 either clockwise or counterclockwise. Since the stud 54 of the drive shaft 50 is engaged with the thrust spool 64, it too rotates either clockwise or counter-clockwise. That rotation of the drive shaft 50 causes linear movement of the blade holder 40 and, thereby, linear movement of the cutting element 28 into and out of the cutting element recess 24, dependent upon the rotation. The drive shaft 50 is fabricated with a two-way screw mechanism, as is the nut 58. A suitable component for the threaded drive shaft 50 is a ⅜-12 LH 2-start Acme screw threading. A suitable component for the nut 58 is a ⅜-12 LH 2-start Acme nut.

The ring section 16 is sized to be large enough to pass over and retain in the interior space 33 a pillar styled candle. When a user wishes to use the tool 10 on a pillar styled candle having a waste wall, the user places the candle within the interior space 33 and adjusts the cutting element 28 by turning the knob 32 thereby actuating the drive shaft 50, nut 58 in its assembly with the holder body 46 and riding on the drive shaft 50, drives the cutting element 28 forward so that the cutting element 28 makes the needed contact with the waste paraffin wall of the partially used candle. Once the cutting element 28 has made contact with the exterior surface of the candle, the knob is rotated in the same direction as previously so as to force the cutting element 28 into the waste paraffin wall. The depth of that initial insertion may be about ¼-inch but is not limited thereto. The user then firmly takes hold of the handle section 18 while simultaneously gripping the pillar candle that is being trimmed/cut. The user then rotates the candle completely within the tool 10 so that the candle wall has a cut through its entire outer perimeter. Once having gone one full turn around with the candle, the user again turns the knob 32 to drive the cutting element 28 another approximately ¼-inch further into the waste wall of the candle. The rotation of the candle fully within the tool 10 may then be repeated. The process may be repeated with further extension of the cutting element 28 by rotation of the knob 32 in the event the waste wall is not fully removed from the base of the candle. It is to be noted that the tool 10 instead could be rotated and the candle maintained in a stationary position.

Caution should always be used when using the tool 10 to make certain that any flame of the candle is completely extinguished and no hot wax remains before the cutting process is initiated. Caution with the tool 10 should also be kept in mind by fully recessing the cutting element 28 within the cutting element recess 24 by rotating the knob 32 in the opposite direction of the direction used to extend the cutting element 28 into the interior space 33 whenever the tool 10 is not in use. That reversal of movement of the cutting element 28 may aid in cleaning any wax from the cutting element 28 as it recedes into the recess 24.

While this invention has been described with respect to particular examples of certain components, it will be apparent to those of skill in the art that alternatives, modifications and variations may be created without deviating from the invention as expressly described and claimed by the following claims. Accordingly, the preferred embodiments of the invention as set forth above are intended to be illustrative, not limiting. Various changes may be made without departing from the spirit and scope of the invention.

What is claimed is:

1. A method of cutting a pillar candle comprising the steps of:
   a. placing a pillar candle within an interior space established by a ring section of a precision candle cutting tool, the cutting tool comprising:
      i. the ring section;
      ii. a handle section;
      iii. a knob coupled to the handle section; and
      iv. a transition section between the ring section and the handle section, wherein the transition section includes a cutting element therein, wherein the ring section is configured to be placed around the pillar styled candle and the handle section includes an actuator, wherein the actuator includes a blade holder connected to the cutting element, wherein the blade holder includes a drive shaft connected to the knob and that produces linear movement of the blade holder when the knob is rotated;
   b. adjusting the cutting element by turning the knob in a first direction to move the cutting element forward to contact a waste paraffin wall of the candle;
   c. forcing the cutting element into the waste paraffin wall by further mining the knob in the first direction to advance the cutting element;
   d. gripping the candle;
   e. rotating the candle within the interior space to cause cutting of the entire waste paraffin wall with the cutting element;

f. adjusting the cutting element by turning the knob in the first direction to advance the cutting element further into the waste paraffin wall;

g. rotating the candle again within the interior space to cause cutting of the entire waste paraffin wall with the cutting element; and h. repeating steps f. and g. until the waste paraffin wall can be is removed from the candle.

2. The method of claim 1 wherein the advancing of the cutting element advances the cutting element ¼-inch into the waste paraffin wall.

3. The method of claim 1 wherein the drive shaft is threaded for two-direction rotation.

4. The method of claim 3 wherein the actuator further includes a thrust spool coupling the drive shaft to the knob.

5. The method of claim 3 wherein the cutting element is advanced by the thrust spool that is rotated by an advancing screw.

\* \* \* \* \*